US009392249B2

(12) United States Patent
Choe et al.

(10) Patent No.: US 9,392,249 B2
(45) Date of Patent: Jul. 12, 2016

(54) METHOD AND APPARATUS FOR TRANSMITTING/RECEIVING A DIGITAL BROADCASTING SIGNAL

(75) Inventors: Jeehyun Choe, Seoul (KR); Jongyeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 308 days.

(21) Appl. No.: 13/981,457

(22) PCT Filed: Jan. 20, 2012

(86) PCT No.: PCT/KR2012/000526
§ 371 (c)(1),
(2), (4) Date: Jul. 24, 2013

(87) PCT Pub. No.: WO2012/102522
PCT Pub. Date: Aug. 2, 2012

(65) Prior Publication Data
US 2013/0307928 A1    Nov. 21, 2013

Related U.S. Application Data

(60) Provisional application No. 61/435,789, filed on Jan. 25, 2011.

(51) Int. Cl.
*H04N 13/00* (2006.01)

(52) U.S. Cl.
CPC ......... *H04N 13/0018* (2013.01); *H04N 13/007* (2013.01); *H04N 13/0011* (2013.01); *H04N 13/0066* (2013.01)

(58) Field of Classification Search
CPC .................................................. H04N 13/0048
USPC ........................................................... 348/43
See application file for complete search history.

(56) References Cited

U.S. PATENT DOCUMENTS

| 2007/0086646 A1 | 4/2007 | Yang et al. |
| 2010/0007721 A1 | 1/2010 | Kim et al. |
| 2011/0234760 A1* | 9/2011 | Yang ................. H04N 13/0048 348/46 |

FOREIGN PATENT DOCUMENTS

| CN | 1954606 A | 4/2007 |
| EP | 2149862 A2 | 2/2010 |

(Continued)

*Primary Examiner* — Hung Dang
*Assistant Examiner* — Girumsew Wendmagegn
(74) *Attorney, Agent, or Firm* — Dentons US LLP

(57) ABSTRACT

The present invention relates to a method and apparatus for transmitting/receiving a digital broadcasting signal including a 3-dimensional image. An apparatus for receiving a digital broadcasting signal, according to an embodiment of the present invention, comprises: a tuner for receiving a digital broadcasting signal including a stereoscopic 3D image signal containing edge handling information; a demultiplexer for demultiplexing the received digital broadcasting signal; a decoder for decoding the 3D image signal of the demultiplexed broadcasting signal to extract original images and the edge handling information; an image editor for editing images by cropping and stretching some portions of the original images using the edge handling information; a graphic engine for creating a floating window using the edge handling information; an on screen display (OSD) for overlaying the created floating window over the original images; and a formatter for receiving the edited images or the floating window-overlaid images to output a stereoscopic 3D image signal with the edge handled.

12 Claims, 13 Drawing Sheets

(56) References Cited

FOREIGN PATENT DOCUMENTS

| | | | |
|---|---|---|---|
| EP | 2 357 823 | A1 | 8/2011 |
| JP | 2006094083 | A | 4/2006 |
| KR | 1020070055882 | A | 5/2007 |
| KR | 1020100000951 | A | 1/2010 |
| WO | 2010/064774 | A1 | 6/2010 |

* cited by examiner

Fig. 1
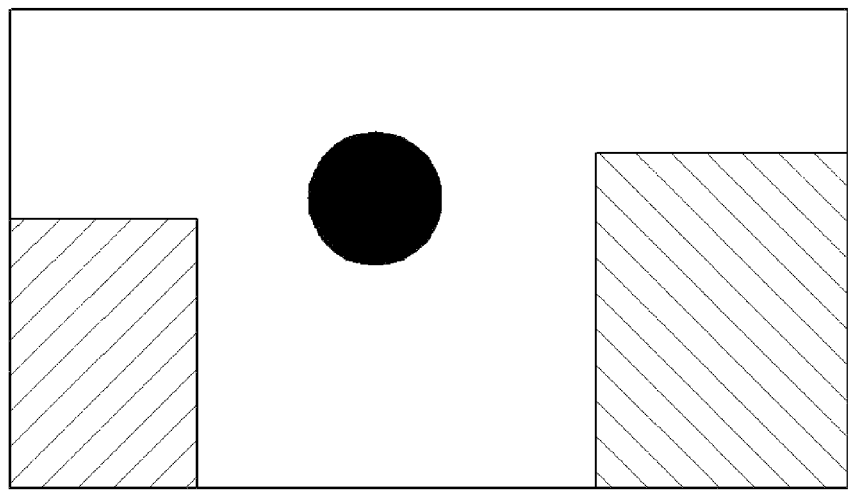
(a)
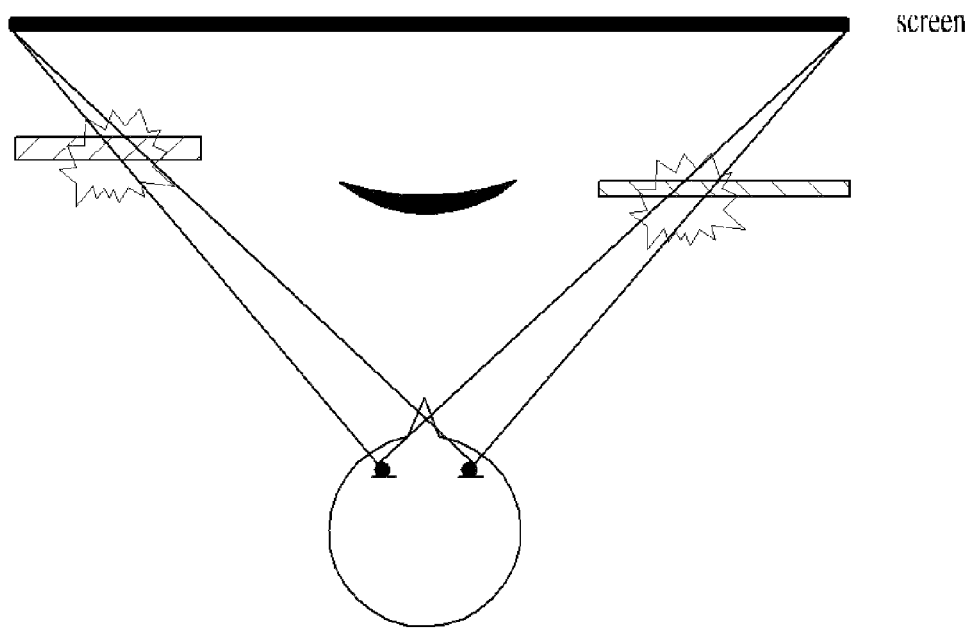
(b)

Fig. 3
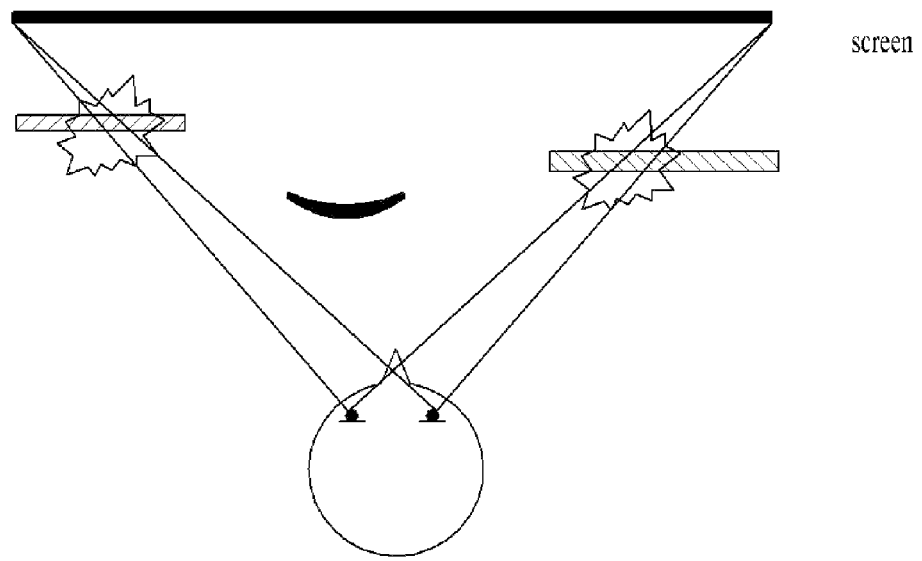
(a)
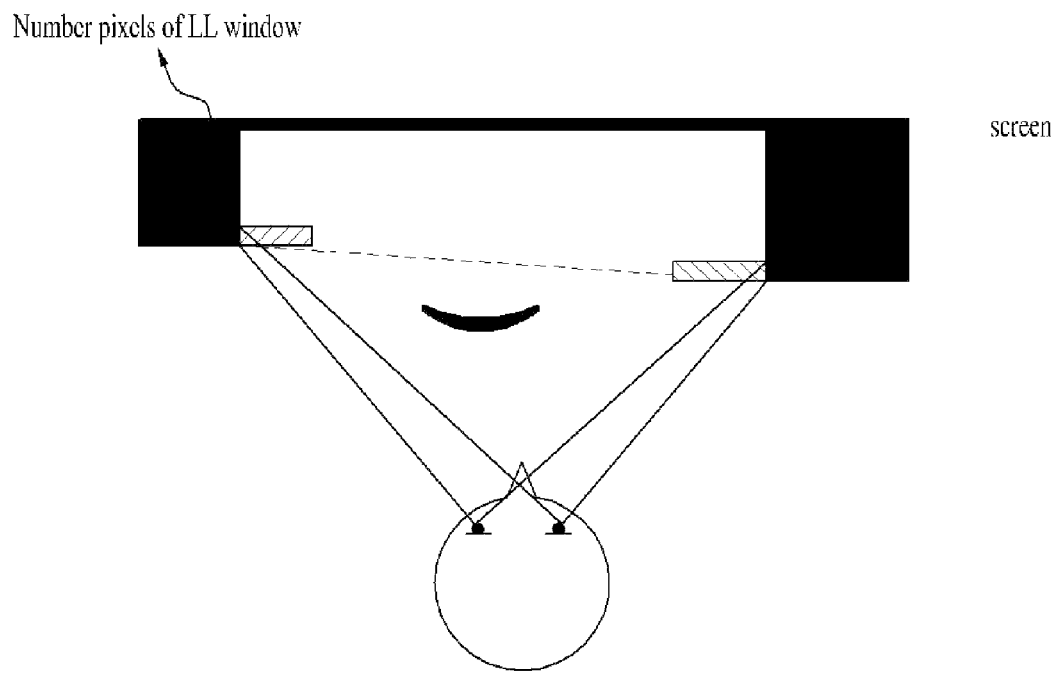
(b)

Fig. 4
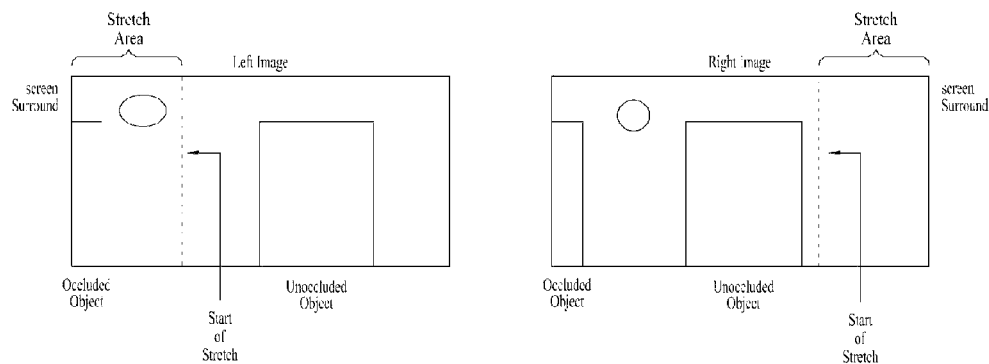
Fig. 5
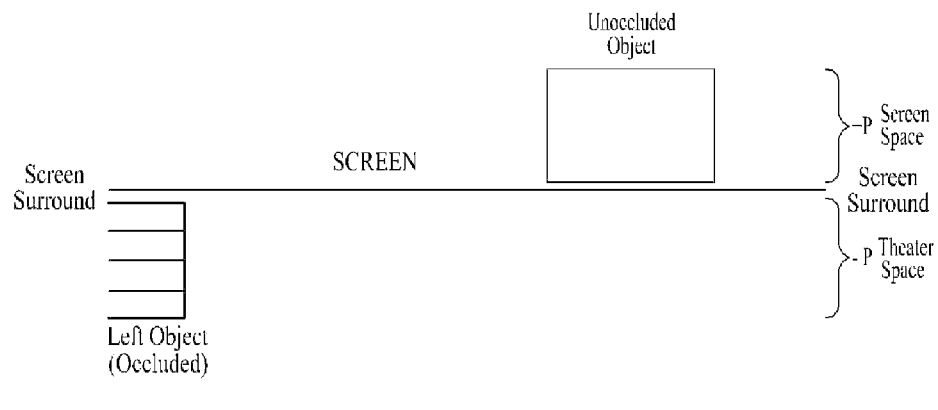
(a)
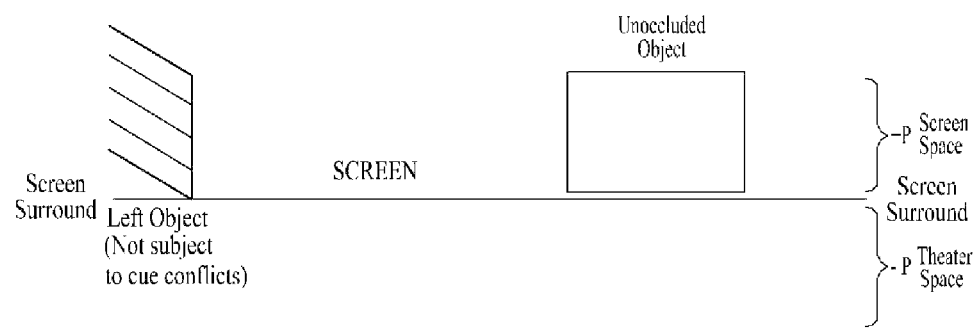
(b)

Fig. 7
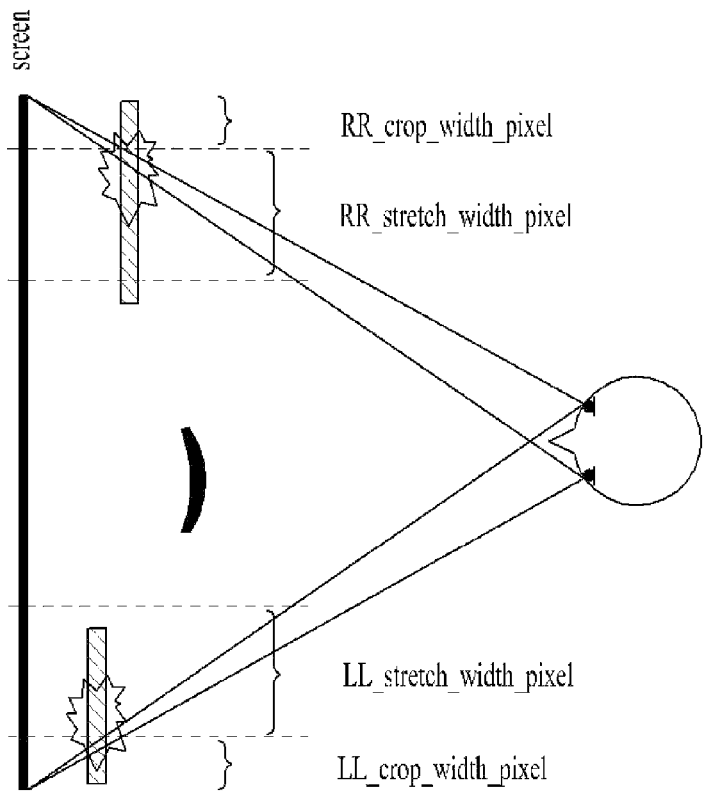
(a)
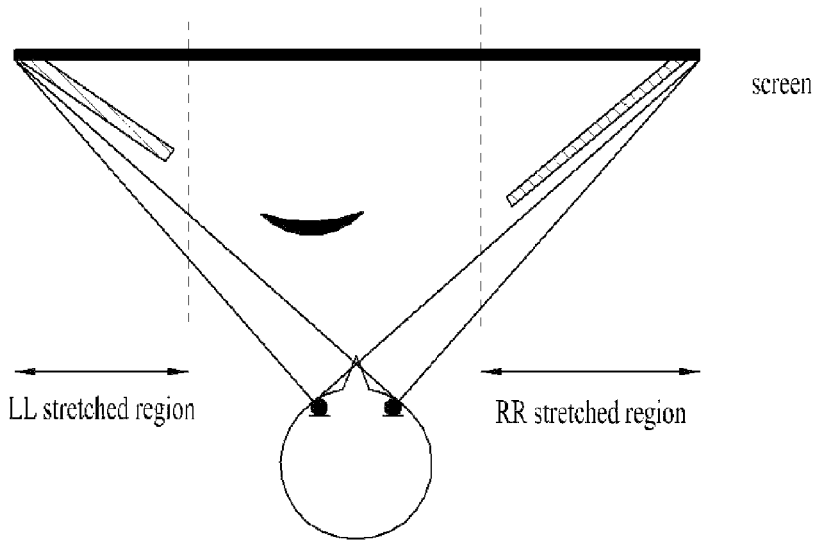
(b)

Fig. 8

| Syntax | # of bits | Format |
|---|---|---|
| EH_data() { | | |
|     LL_edge_flag | 1 | bslbf |
|     LR_edge_flag | 1 | bslbf |
|     RL_edge_flag | 1 | bslbf |
|     RR_edge_flag | 1 | bslbf |
|     reserved | 4 | '1111' |
|     if (LL_edge_flag == '1') { | | |
|         marker_bits | 6 | '111111' |
|         LL_handling_type | 2 | uimsbf |
|         if (LL_handling_type == '01') { | | |
|             LL_floating_window_parameter() } | | |
|         If (LL_handling_type == '10') { | | |
|             LL_crop_width_pixel | 12 | uimsbf |
|             LL_stretch_start_pixel | 12 | uimsbf |
|             LL_stretch_width_pixel | 12 | uimsbf |
|             LL_stretch_parameter() } | | |
|     } | | |
|     if (LR_edge_flag == '1') { | | |
|         marker_bits | 6 | '111111' |
|         LR_handling_type | 2 | uimsbf |
|         if (LR_handling_type == '01') { | | |
|             LR_floating_window_parameter() } | | |
|         if (LR_handling_type == '10') { | | |
|             LR_crop_width_pixel | 12 | uimsbf |
|             LR_stretch_start_pixel | 12 | uimsbf |
|             LR_stretch_width_pixel | 12 | uimsbf |
|             LR_stretch_parameter() } | | |
|     } | | |
|     if (RL_edge_flag == '1') { | | |
|         marker_bits | 6 | '111111' |
|         RL_handling_type | 2 | uimsbf |
|         if (RL_handling_type == '01') { | | |
|             RL_floating_window_parameter() } | | |
|         If (RL_handling_type == '10') { | | |
|             RL_crop_width_pixel | 12 | uimsbf |
|             RL_stretch_start_pixel | 12 | uimsbf |
|             RL_stretch_width_pixel | 12 | Uimsbf |
|             RL_stretch_parameter() } | | |
|     } | | |
|     if (RR_edge_flag == '1') { | | |
|         marker_bits | 6 | '111111' |
|         RR_handling_type | 2 | uimsbf |
|         if (RR_handling_type == '01') { | | |
|             RR_floating_window_parameter() } | | |
|         If (RR_handling_type == '10') { | | |
|             RR_crop_width_pixel | 12 | uimsbf |
|             RR_stretch_start_pixel | 12 | uimsbf |
|             RR_stretch_width_pixel | 12 | uimsbf |
|             RR_stretch_parameter() } | | |
|     } | | |
|     marker_bits | | |
|     while (nextbits() != '0000 0000 0000 0000 0000 0001') { | | |
|         additional_bar_data } | | |
| } | | |

Fig. 9

| Syntax | No. of bits | Format |
|---|---|---|
| fw_data() { | | |
|     left_view_left_float_window_flag | 1 | bslbf |
|     left_view_right_float_window_flag | 1 | bslbf |
|     right_view_left_float_window_flag | 1 | bslbf |
|     right_view_right_float_window_flag | 1 | bslbf |
|     reserved | 4 | '1111' |
|     if (left_view_left_float_window_flag == '1') { | | |
|         marker_bits | 2 | '11' |
|         number_pixels_of_LL_window | 14 | uimsbf |
|         if (number_pixels_of_LL_window != 0) { | | |
|             transparency_LL_window | 8 | uimsbf |
|             color_LL_window | 24 | uimsbf |
|         } | | |
|     } | | |
|     if (left_view_right_float_window_flag == '1') { | | |
|         marker_bits | 2 | '11' |
|         number_pixels_of_LR_window | 14 | uimsbf |
|         if (number_pixels_of_LR_window != 0) { | | |
|             transparency_LR_window | 8 | tcimsbf |
|             color_LR_window | 24 | tcimsbf |
|         } | | |
|     } | | |
|     if (right_view_left_float_window_flag == '1') { | | |
|         marker_bits | 2 | '11' |
|         number_pixels_of_RL_window | 14 | uimsbf |
|         if (number_pixels_of_RL_window != 0) { | | |
|             transparency_RL_window | 8 | uimsbf |
|             color_RL_window | 24 | uimsbf |
|         } | | |
|     } | | |
|     if (right_view_right_float_window_flag == '1') { | | |
|         marker_bits | 2 | '11' |
|         number_pixels_of_RR_window | 14 | uimsbf |
|         if (number_pixels_of_RR_window != 0) { | | |
|             transparency_RR_window | 8 | uimsbf |
|             color_RR_window | 24 | uimsbf |
|         } | | |
|     } | | |
|     marker_bits | 8 | '1111 1111' |
|     while (nextbits() != '0000 0000 0000 0000 0000 0001') { | | |
|         additional_bar_data | | |
|     } | | |
| } | | |

Fig. 10

| XY_handling_type | Description |
|---|---|
| 00 | Preprocessed (pre-handled) |
| 01 | Floating window recommended |
| 10 | Vertical edge treatment recommended |
| 11 | Reserved |

METHOD AND APPARATUS FOR TRANSMITTING/RECEIVING A DIGITAL BROADCASTING SIGNAL

This application is a National Stage entry of International Application No. PCT/KR2012/000526, filed on Jan. 20, 2012, which claims priority to U.S. Provisional Application No. 61/435,789filed Jan. 25, 2011, which is incorporated herein in their entirety by reference.

TECHNICAL FIELD

The present invention relates to a method of transmitting and receiving a digital broadcasting signal including a 3 dimensional image and apparatus therefor, more particularly, to a method of transmitting and receiving a digital broadcasting signal configured to transmit and receive a signaling data to prevent an edge violation phenomenon occurred in a left/right boundary of a screen and an apparatus therefor in displaying a digital broadcasting signal including a 3 dimensional image.

BACKGROUND ART

As the dissemination of a 3 dimensional television (3DTV) is raging, a transmission of a 3D image content performed by a digital broadcasting as well as the dissemination of the 3D image content performed by a storing media is vitalized.

In general, a 3 dimensional image provides a 3D effect using a principle of stereo vision of two eyes. Since a human feels perspective via parallax of two eyes, in other word, binocular parallax due to a space between two eyes apart from each other about 65 mm, the 3D image may provide the 3D effect and the perspective in a manner of providing an image, which makes a left eye and a right eye see a related plane image, respectively.

The 3D image display method includes a stereoscopic technique, a volumetric technique, a holographic technique, and the like. In case of the stereoscopic technique, it provides a left view image supposed to be watched by a left eye and a right view image supposed to be watched by a right eye. The stereoscopic technique enables to recognize a 3D image effect in a manner of making the left eye and the right eye watch the left view image and the right view image respectively using a polarized glasses or a display device itself.

In case of a stereoscopic 3D image content, if two similar images having viewpoints different from each other are transmitted, the stereoscopic technique uses a technique that a receiver displays a 3D image using the two images. In case that the 3D image is displayed by the receiver, a 3D image is provided in a manner that the binocular disparity occurs due to a disparity between a left image and a right image.

When a 3D image is provided, a situation that an object of a negative disparity configured to extrude to a front of a screen (to a viewer) due to the binocular disparity according to each content, a scene in each of the contents, or a frame is extended on a left/right boundary surface of the screen may occur. In this case, since there may exist a difference between a depth perception recognized by the binocular disparity and the depth perception recognized by a screen boundary bezel, a user may feel a distorted depth perception.

This is called an edge violation. Because of an edge violation phenomenon, a viewer may feel a visual fatigue and is then difficult to normally watch content. Moreover, a current 3D image receiver does not have a separate process capable of processing the edge violation.

DISCLOSURE OF THE INVENTION

Technical Task

The present invention is intended to solve the aforementioned problems. The technical task that the present invention intends to achieve is to display a 3D image in a manner of receiving a digital broadcasting signal including a signaling information configured to display the 3D image without experiencing the aforementioned problem according to a method of receiving the digital broadcasting signal and apparatus therefor.

Technical Solution

In order to solve the aforementioned technical task, a digital broadcasting signal receiving device according to one embodiment of the present invention includes a tuner configured to receive a digital broadcasting signal, which includes a stereoscopic 3 dimensional image signal containing an edge handling information, a demultiplexer configured to demultiplex the received digital broadcasting signal, a decoder configured to extract original images and the edge handling information by decoding the 3 dimensional image signal among the demultiplexed broadcasting signal, an image editing unit configured to edit images by cropping and stretching a part of a region of the original images using the edge handling information, a graphic engine configured to generate a floating window using the edge handling information, an On Screen Display (OSD) configured to overlay the original images with the generated floating window, and a formatter configured to output an edge handled stereoscopic 3 dimensional image signal by receiving the edited images or the images overlaid with the floating window as an input.

And, the digital broadcasting signal receiving device according to one embodiment of the present invention further includes an image selector configured to output to the formatter in a manner of selecting either the edited image or the image overlaid with the floating window.

And, the edge handling information of the digital broadcasting signal receiving device according to one embodiment of the present invention includes at least one information on selected from the group consisting of a vertical edge treatment and the floating window.

And, the information on the vertical edge treatment of the digital broadcasting signal receiving device according to one embodiment of the present invention includes at least one information on selected from the group consisting of an area of a region to be cropped, a starting point of a region to be stretched, an area of a region to be stretched, and a stretch method.

And, the information on the floating window of the digital broadcasting signal receiving device according to one embodiment of the present invention includes at least one selected from the group consisting of an area of the floating window, color, and transparency.

And, if the edge handling information indicates that the original images are already preprocessed, the image editing unit, the graphic engine and the OSD are configured not to operate.

In order to solve the aforementioned technical task, a method of receiving a digital broadcasting signal according to one embodiment of the present invention includes the steps of receiving a digital broadcasting signal, which includes a stereoscopic 3 dimensional image signal containing an edge handling information, demultiplexing the received digital broadcasting signal, extracting original images and the edge handling information by decoding the 3 dimensional image signal among the demultiplexed broadcasting signal, editing images by cropping and stretching a part of a region of the original images using the edge handling information or generating a floating window and overlaying the original images with the floating window, and outputting an edge handled stereoscopic 3 dimensional image signal by receiving the edited images or the images overlaid with the floating window as an input.

And, the method of receiving a digital broadcasting signal according to one embodiment of the present invention further includes the step of selecting either the edited image or the image overlaid with the floating window before the step of outputting the 3 dimensional image signal.

And, the edge handling information of the method of receiving a digital broadcasting signal according to one embodiment of the present invention includes at least one information on selected from the group consisting of a vertical edge treatment and the floating window.

And, the information on the vertical edge treatment of the method of receiving a digital broadcasting signal according to one embodiment of the present invention includes at least one information on selected from the group consisting of an area of a region to be cropped, a starting point of a region to be stretched, an area of a region to be stretched, and a stretch method.

And, the information on the floating window of the method of receiving a digital broadcasting signal according to one embodiment of the present invention includes at least one selected from the group consisting of an area of the floating window, color, and transparency.

And, if the edge handling information indicates that the original images are already preprocessed, the method of receiving a digital broadcasting signal according to one embodiment of the present invention does not perform the step of editing the images or overlaying the floating window.

Advantageous Effects

According to the present invention, a method of receiving a digital broadcasting signal and apparatus therefor has an effect as follows.

According to one embodiment of the present invention, a 3D image signal can be displayed in a manner of receiving a digital broadcasting signal.

According to one embodiment of the present invention, an image, which is not occurred an edge violation, can be displayed in a manner of receiving a digital broadcasting signal.

According to one embodiment of the present invention, it may be able to limit a post processing of a receiver itself in a manner of receiving a digital broadcasting signal on which an edge handling is processed.

DESCRIPTION OF DRAWINGS

FIG. 1 is a diagram of a case that an edge violation of a 3D image occurs according to one embodiment of a legacy invention;

FIG. 3 is a diagram of depth perception perceived by a user in case of applying a floating window according to one embodiment of the present invention;

FIG. 4 is a diagram of a screen to which a vertical edge treatment is applied according to one embodiment of the present invention;

FIG. 5 is a diagram of depth perception of a 3D image to which a vertical edge treatment is applied according to one embodiment of the present invention;

FIG. 7 is a diagram of depth perception perceived by a user in case of applying a vertical edge treatment scheme according to one embodiment of the present invention;

FIG. 8 is a diagram of a syntax structure of a signaling information for an edge handling according to one embodiment of the present invention;

FIG. 9 indicates a parameter set necessary to implement a floating window according to one embodiment of the present invention;

FIG. 10 is a diagram of XY_handling_type according to one embodiment of the present invention;

BEST MODE

Figure 2:
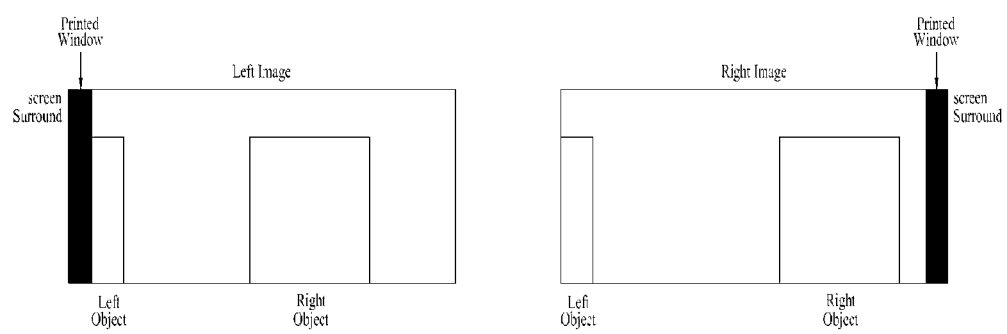
FIG. 2 is a diagram of a screen to which a floating window is applied according to one embodiment of the present invention.

Reference will now be made in detail to the preferred embodiments of the present invention, examples of which are illustrated in the accompanying drawings. Yet, the present invention may be non-limited or non-restricted by the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The method of expression for a 3 dimensional image may include a stereoscopic technique considering two viewpoints and a multiple view image technique (or a multi-view technique) considering more than 3 viewpoints. Comparably, a conventional single view image technique may be called a monoscopic image technique.

The stereoscopic technique uses a pair of image, i.e., a left view image (hereinafter a left image) and a right view image (hereinafter a right image) obtained by photographing a same subject with a left camera and a right camera, which are away a certain distance from each other. Or, the stereoscopic technique uses a pair of image of a reference image and an additional image. The multi-view technique uses more than 3 images obtained by photographing with 3 or more cameras having a certain distance and angle. In the following description, although the present invention explains the stereoscopic technique as one embodiment, the idea of the present invention may also be applied to the multi-view technique.

According to the present invention, the stereoscopic technique includes a side-by-side, a top-down, a checker board technique, and the like. The side-by-side technique is a technique configuring one stereoscopic image by performing a half down sampling horizontally on each of a left image and a right image, respectively and situating one sampled image in a left region and the other sampled image in a right region. The top-down technique is a technique configuring one stereoscopic image by performing a half down sampling vertically on each of a left image and a right image, respectively and situating one sampled image in a top region and the other sampled image in a bottom region. The checker board technique is a technique configuring one image by performing a half down sampling in a manner that a left image and a right image respectively intersect horizontally and vertically. Yet, the stereoscopic technique according to the present invention may be non-limited or non-restricted by the aforementioned example. As one example, it is also possible to provide a 3D image service in a manner of transceiving two images having an intact resolution without going through the aforementioned down sampling process.

FIG. 1 is a diagram of a case that an edge violation of a 3D image occurs according to one embodiment of a legacy invention.

FIG. 1 (a) is a front view of a screen displaying a 3D image. As shown in FIG. 1 (a), since an object of a circle form is situated at a center of the screen, there does not exist an overlapped part with an edge of a display screen. Hence, the position of the object of the circle form corresponds to a part that an edge violation does not occur. Yet, since a rectangular object of a left side and a rectangular object of a right side are existed at the edge of the display screen, the aforementioned edge violation may occur.

FIG. 1 (b) is a picture seen from above of relative depth perception for each part of images recognized by a user when the user watches a 3D image. The circular object located at the center is perceived as a nearest to the user and the left/right rectangles are perceived as arranged at the back of the circular object. Since the rectangular objects situated at the left/right of the screen have a negative disparity, the rectangular objects are perceived as they are situated at a position near to the user on the basis of the screen.

Yet, at the same time, since the rectangular objects are situated at the both edges of the screen, it may be perceived to the user as a part of the rectangles is blocked by a bezel, which is an edge of the screen. Hence, while the rectangles situated at the left and the right are perceived as positioned near to the user on the basis of the screen, the rectangles can be perceived as positioned at the back of the screen as well, since the rectangles are blocked by the bezel of the screen, thereby confusing the user in terms of depth perception.

According to a method of transmitting and receiving a digital broadcasting signal and apparatus therefor of the present invention, it may be able to provide a signaling information to make an environment providing a stable depth perception in a manner of applying such an edge handling scheme as a floating window or a vertical edge treatment to the edge of a 3D image to avoid the edge violation.

In case of applying the edge handling, an applying method can vary according to contents. Thus, a metadata, which enables to select and apply a suitable method in accordance with a signaling, is described.

The floating window or the vertical edge treatment scheme can be directly processed by a receiver or may be a form included in content itself in an image production step. In case that the floating window or the vertical edge treatment scheme is included in the image production step, the floating window is gradually pulled forward to make an effect as if a camera is getting far away from an object or the floating window is gradually pushed to a screen and may be completely disappeared to make an effect as if the camera is getting closer to the object. And, in case that an object/figure positioned in the outside of the screen suddenly shows up in the left or right boundary surface or the object/figure positioned in the inside of the screen is disappeared from the screen via the edge, a random floating window or a vertical edge treatment can be configured in the content production step.

The present invention proposes a method of performing an edge handling based on the information received by a receiver by signaling an edge handling information by a frame unit. The present invention is described centering on a vertical edge treatment scheme.

In case that an edge handling is included in content itself, a part of a post processing job processed by a receiver itself can be limited by utilizing the information indicating that the edge handling for the content is already processed by a receiving end. Related information may mainly include the forms as follows.

An edge_treated_flag can be used as an identifier indicating whether an edge treatment is included in a current content.

A handled_type may be able to indicate whether a scheme applied to perform an edge handling corresponds to a floating window scheme, a vertical edge treatment (stretching), or the other scheme.

An applied_LL_pixels/applied_LR_pixels/applied_RL_pixels/applied_RR_pixels can represent a region to which an edge handling is applied in a left/right boundary of a left image and the left/right boundary of a right image by a pixel unit.

FIG. 2 is a diagram of a screen to which a floating window is applied according to one embodiment of the present invention.

A floating window scheme is a scheme to avoid a confusion of depth perception in a manner of blocking a part of the region corresponding to the left/right boundary on which an edge violation occurs with a floating window. Referring to FIG. 2, a part of the region corresponding to the left boundary of a left image and a part of the region corresponding to the right boundary of a right image are blocked by the floating window (written as a printed window in FIG. 2). By blocking a part of the region of an image having a negative disparity in the left/right boundary region with the floating window, it may be able to prevent from being overlapped with a bezel. By doing so, it may be able to control the confusion of the depth perception and may be then able to provide stable depth perception.

In order to apply the floating window scheme, a size of the left/right boundary region of the left and right image should be signaled by a pixel unit and transparency of a floating window and color should be signaled as well.

Hence, signaling information on the floating window scheme may include a num_pixels_of_LL_window indicating a size of window for the left side boundary of the left image by a pixel unit. In the same manner, it may be able to include a num_pixels_of_LR_window indicating the size of window for the right side boundary of the left image, a num_pixels_of_RL_window indicating the size of window for the left side boundary of the right image, and a num_pixels_of_RR_window indicating the size of window for the right side boundary of the right image.

And, the signaling information on the floating window scheme may include a transparency_LL_window indicating window transparency of the left side boundary of the left image. In the same manner, it may include a transparency_LR_window indicating window transparency of the right side boundary of the left image, a transparency_RL_window indicating window transparency of the left side boundary of the right image, and a transparency_RR_window indicating window transparency of the right side boundary of the right image.

And, the signaling information on the floating window scheme may include a color_LL_window indicating a window color of the left side boundary of the left image. In the same manner, it may include a color_LR_window indicating the window color of the right side boundary of the left image, a color_RL_window indicating the window color of the left side boundary of the right image, and a color_RR_window indicating the window color of the right side boundary of the right image.

FIG. 3 is a diagram of depth perception perceived by a user in case of applying a floating window according to one embodiment of the present invention.

As shown in FIG. 3 (a), in case that objects having a negative disparity exist at both ends of 3D image viewed by a user, a floating window is arranged at the left/right boundary part as depicted in FIG. 3 (b). If the floating window is arranged, a rectangular object used to be seen as being overlapped with a bezel part positioned outside of a screen region due to the negative disparity in FIG. 3 (a), the part overlapped with the bezel part become disappeared in a manner that a part of the rectangular object is blocked by the floating window. The floating window as many as the pixel of the num_pixels_of LL_window is arranged in a left edge region and the floating window as many as the pixel of the num_pixels_of_RR_window is arranged in a right edge region.

Consequently, since a 3D image overlapped with the bezel part is not provided to the user, a confusion of depth perception may not occur.

FIG. 4 is a diagram of a screen to which a vertical edge treatment is applied according to one embodiment of the present invention.

The vertical edge treatment scheme is a scheme preventing from a confusion of depth perception in a manner of cropping a part of a region corresponding to a left/right boundary in which an edge violation occurs and stretching a part of the remaining region. In FIG. 3, it may be able to check a result of displaying by stretching a part of the region (stretch area) corresponding to a left boundary of a left image and the part of the region corresponding to a right boundary of a right image. In order to prevent a part of the region having a negative disparity in the left/right boundary region from being overlapped with a bezel, it is able to make the part of region have a positive disparity or a zero disparity. By doing so, it may be able to control a confusion of depth perception and may be then able to provide stable depth perception.

In order to apply the vertical edge treatment scheme, an area of the region to be cropped in the left/right boundary region should be signaled by a pixel unit and the area of the region to be stretched should be signaled by the pixel unit. And, information on a type of stretching should be signaled as well.

Hence, the signaling information of the vertical edge treatment scheme may be able to include an LL_crop_width_pixels indicating the area of the region to be cropped for a left boundary of a left image by the pixel unit. In a same manner, it may be able to include an LR_crop_width_pixels indicating the area of the region to be cropped for a right boundary of the left image, an RL_crop_width_pixels indicating the area of the region to be cropped for the left boundary of a right image, and an RR_crop_width_pixels indicating the area of the region to be cropped for the right boundary of the right image.

And, the signaling information of the vertical edge treatment scheme may be able to include an LL_stretch_width_pixels indicating the area of the region to be stretched for a left boundary of a left image by the pixel unit. In a same manner, it may be able to include an LR_stretch_width_pixels indicating the area of the region to be stretched for a right boundary of the left image, RL_stretch_width_pixels indicating the area of the region to be stretched for a left boundary of a right image, and RR_stretch_width_pixels indicating the area of the region to be stretched for a right boundary of a right image.

And, the signaling information of the vertical edge treatment scheme may be able to include an LL_stretch_type indicating a stretch type of a region to be stretched for a left boundary of a left image. In a same manner, it may be able to include an LR_stretch_type indicating a stretch type of a region to be stretched for a right boundary of a left image, an RL_stretch_type indicating a stretch type of a region to be stretched for a left boundary of a right image, and an RR_stretch_type indicating a stretch type of a region to be stretched for a right boundary of a right image. In the present invention, the stretch type may correspond to a linear stretch or a nonlinear stretch. A parameter necessary to perform a stretch may be various. Explanation on the parameter shall be described in detail in the following description.

FIG. 5 is a diagram of depth perception of a 3D image to which a vertical edge treatment is applied according to one embodiment of the present invention.

FIG. 5 (a) indicates depth perception before the vertical edge treatment is applied. It may be able to check that a left object among 3D images has a negative disparity forward of a screen. This kind of object may have an edge violation due to an edge of the screen. Hence, the vertical edge treatment can be applied to the object.

FIG. 5 (b) indicates the depth perception after the vertical edge treatment is applied. It may be able to check that the left object used to have the negative disparity in FIG. 5 (a) has a positive disparity in FIG. (b) by moving to a back region on the basis of the screen. By doing so, since the left object is perceived to a user as positioned at a region behind the edge of the screen, it may be able to avoid a confusion of depth perception. By controlling a part having the negative disparity at the left/right boundary of the screen, it may be able to make the depth nearest to a viewer unconditionally position at the back of the screen or at an identical line of the screen at the end of the screen.

Figure 6:
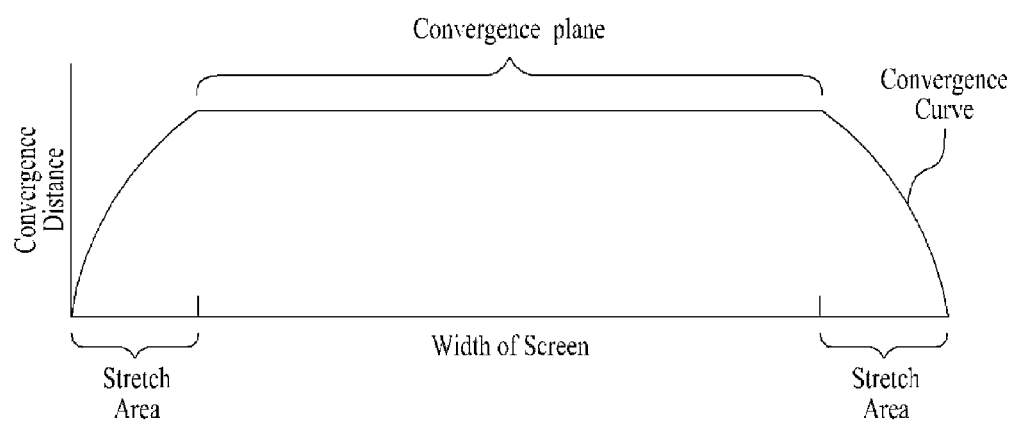
FIG. 6 is a diagram of a convergence distance configuration after applying a vertical edge treatment according to one embodiment of the present invention.

FIG. 6 is a diagram of a convergence distance configuration after applying a vertical edge treatment according to one embodiment of the present invention.

As described in FIG. 5, if the vertical edge treatment is applied, the images displayed in the last part of the left/right of the screen may be controlled to have a positive disparity or a zero disparity. In FIG. 6, a convergence plane part means a region in which the depth perception intended to represent by a 3D image is freely represented.

Unlike the convergence plane part, a part corresponding to a convergence curve is controlled to have the zero disparity in a manner of constructing a gentle curve as approaching to the both ends of the screen. In particular, in the convergence curve region, although a 3D image intends to represent a negative disparity, the depth perception is controlled to have the zero disparity or the positive disparity in order to be perceived to a user as if the last part of the left/right side is positioned at the behind of the edge of the screen. The convergence curve region is represented by a stretch area stretched by the vertical edge treatment.

FIG. 7 is a diagram of depth perception perceived by a user in case of applying a vertical edge treatment scheme according to one embodiment of the present invention.

As shown in FIG. 7 (a), in case that an object having a negative disparity in the last part of both a left/right of a 3D image viewed by a user exists, the vertical edge treatment scheme crops a part of the region and stretches a part of the remaining region. The region to be cropped may correspond to an LL_crop_width_pixels in a left edge and an RR_crop_width_pixels in a right edge. The part of the region to be stretched extends a screen size to the screen size prior to the crop in a manner of stretching an LL_stretch_width_pixels in the left edge and an RR_stretch_width_pixels in the right edge among the remaining region after cropping.

Through the crop and stretch operation, the depth perception of the rectangular object used to be seen as duplicated with the bezel part existed at the outside of the screen region due to a negative disparity in FIG. 7 (a) is controlled to have a zero disparity at the edges of the both ends of the screen as shown in FIG. 7 (b). Hence, there does not exist a part of a 3D image duplicated with the bezel part, in particular, there does not exist the part of the 3D image, which looks as if the part of the 3D image has extruded more to a user compared to the bezel part and it is possible to eliminate a confusion of the depth perception.

FIG. 8 is a diagram of a syntax structure of a signaling information for an edge handling according to one embodiment of the present invention.

A method of preventing an edge violation, which is a mismatch distortion in left/right viewpoint, may include a method of transmitting a 3D content after performing a post processing on the 3D content itself in advance by a broadcasting station, a method of transmitting a floating window parameter, which is recommended, a method of transmitting a vertical edge treatment parameter, and the like. It is possible to apply different methods to every edge according to a situation in a manner of mixing the methods and it is also possible to differentiate an application method according to a frame.

An edge handling-related data can be provided with a metadata for image contents and can be transmitted in a manner of being included in a video user data via an EH_data( )as shown in FIG. 8. The information included in the EH_data( )is as follows.

A XY_edge_flag indicates that a post processing job is necessary or existed in a Y side edge of an image of X timing point. A receiver may be able to know that an invalid region exists in the Y side edge of the image of the X timing point using the XY_edge_flag. In this case, X,Y can indicate one of a left and a right, respectively.

If an LL_edge_flag is set to '1', it indicates that a post processing job is necessary or exists in a left side edge of a left image.

If an LR_edge_flag is set to '1', it indicates that a post processing job is necessary or exists in a right side edge of a left image.

If an RL_edge_flag is set to '1', it indicates that a post processing job is necessary or exists in a left side edge of a right image.

If an RR_edge_flag is set to '1', it indicates that a post processing job is necessary or exists in a right side edge of a right image.

A XY_handling_type designates an edge violation processing scheme applied to a Y side edge of an X image. This shall be described in detail in FIG. 10.

A XY_floating_window_parameter indicates a parameter set necessary to implement a floating window applied to a Y side edge of an X image. This shall be described in detail in FIG. 9.

An LL_crop_width_pixel designates a size of a region to be cropped, which is configured by a top-to-bottom strip for a left image from the very left pixel to the pixel as many as designated by this value.

An LL_stretch_start_pixel designates a starting point of a region to which a stretch to be applied after performing a crop for a left image. A position of the starting point means a pixel distance from a left edge of a left image.

An LL_stretch_width_pixel designates a region to be stretched, which is configured by a top-to-bottom strip for a left image from an LL_stretch_start_pixel as a starting point to the pixel as many as designated by this value, after excluding as many pixels as an LL_crop_width_pixel from a left edge.

Consequently, a region to which a stretch is applied after performing a crop for a left view image corresponds to a rectangular region having an abscissa from the LL_stretch_start_pixel to (LL_stretch_start_pixel+LL_stretch_width_pixel−1).

An LL_stretch_parameter( )is a parameter indicating how a left edge of a left image is stretched. There may exist such a various stretch method as a linear and a nonlinear method. In a stretching implementation process, it may be able to include information on a filtering method and a coefficient to perform an interpolation.

In case of LR/RL/RR, the aforementioned scheme explained for the LL is applied in the same manner. Yet, there exist a difference as follows.

An LR_crop_width_pixel designates a size of a region to be cropped, which is configured by a top-to-bottom strip for a left image from the very right pixel to the pixel as many as designated by this value.

An LR_stretch_start_pixel designates a starting point of a region to which a stretch to be applied after performing a crop for a left image. A position of the starting point means a pixel distance from a right edge of a left image.

An LR_stretch_width_pixel designates a region to be stretched, which is configured by a top-to-bottom strip for a left image from an LR_stretch_start_pixel as a starting point to the pixel as many as designated by this value, after excluding as many pixels as an LR_crop_width_pixel from a right edge.

Consequently, a region to which a stretch is applied after performing a crop for a left view image corresponds to a rectangular region having an abscissa from (a right edge−LR_stretch_start_pixel−LR_stretch_width_pixel+1) to (a right edge−LL_stretch_start_pixel). In the above formula, 'the right edge' means a pixel value of a very right edge of a left view image.

An LR_stretch_parameter( )is a parameter indicating how a right edge of a left image is stretched. There may exist such a various stretch method as a linear and a nonlinear method. In a stretching implementation process, it may be able to include information on a filtering method and a coefficient to perform an interpolation.

An RL_crop_width_pixel designates a size of a region to be cropped, which is configured by a top-to-bottom strip for a right image from the very left pixel to the pixel as many as designated by this value.

An RL_stretch_start_pixel designates a starting point of a region to which a stretch to be applied after performing a crop for a right image. A position of the starting point means a pixel distance from a left edge of a right image.

An RL_stretch_width_pixel designates a region to be stretched, which is configured by a top-to-bottom strip for a right image from an RL_stretch_start_pixel as a starting point to the pixel as many as designated by this value, after excluding as many pixels as an RL_crop_width_pixel from a left edge.

Consequently, a region to which a stretch is applied after performing a crop for a right view image corresponds to a rectangular region having an abscissa from the RL_stretch_start_pixel to (RL_stretch_start_pixel+RL_stretch_width_pixel−1).

An RL_stretch_parameter( ) is a parameter indicating how a left edge of a right image is stretched. There may exist such a various stretch method as a linear and a nonlinear method. In a stretching implementation process, it may be able to include information on a filtering method and a coefficient to perform an interpolation.

An RR_crop_width_pixel designates a size of a region to be cropped, which is configured by a top-to-bottom strip for a right image from the very right pixel to the pixel as many as designated by this value.

An RR_stretch_start_pixel designates a starting point of a region to which a stretch to be applied after performing a crop for a right image. A position of the starting point means a pixel distance from a right edge of a right image.

An RR_stretch_width_pixel designates a region to be stretched, which is configured by a top-to-bottom strip for a right image from an RR_stretch_start_pixel as a starting point to the pixel as many as designated by this value, after excluding as many pixels as an RR_crop_width_pixel from a right edge.

Consequently, a region to which a stretch is applied after performing a crop for a right view image corresponds to a rectangular region having an abscissa from (a right edge−RR_stretch_start_pixel−RR_stretch_width_pixel+1) to (a right edge−RR_stretch_start_pixel). In the above formula, 'the right edge' means a pixel value of a very right edge of a right view image.

An RR_stretch_parameter( ) is a parameter indicating how a right edge of a right image is stretched. There may exist such a various stretch method as a linear and a nonlinear method. In a stretching implementation process, it may be able to include information on a filtering method and a coefficient to perform an interpolation.

FIG. 9 indicates a parameter set necessary to implement a floating window according to one embodiment of the present invention.

The floating window is a scheme applied to a stereoscopic image and designed to provide a specific effect in a manner of blocking a left, a right, or both the left and the right of an image region with a top-to-bottom strip for each of a left image and a right image. By using this scheme, an optical illusion effect, which looks as if a screen (a region blocked by the floating window) has extruded to the front, can be obtained. And, the floating window scheme may be able to prevent a left/right viewpoint from a mismatch distortion, i.e., an edge violation. For instance, this distortion may occur in case that an object is disappeared from a screen edge due to a time difference existing between a left image and a right image. A floating window data can be given as a metadata for video contents and can be transmitted via a fw_data( ) in a manner of being included in a video user data.

The information included in the fw_data( ) is as follows.

If a left_view_left_float_window_flag is set to '1', it indicates that a left side floating window of a left image exists.

If a left_view_right_float_window_flag is set to '1', it indicates that a right side floating window of a left image exists.

If a right_view_left_float_window_flag is set to '1', it indicates that a left side floating window of a right image exists.

If a right_view_right_float_window_flag is set to '1', it indicates that a right side floating window of a right image exists.

A number_pixels_of_LL_window designates a left window region configured by a top-to-bottom strip for a left image from a very left pixel to the pixel as many as designated by this value.

A transparency_LL_window designates transparency of a left window for a left image.

A color_LL_window designates a color value of a left window for a left image.

A number_pixels_of_LR_window designates a right window region configured by a top-to-bottom strip for a left image from a very right pixel to the pixel as many as designated by this value.

A transparency_LR_window designates transparency of a right window for a left image.

A color_LR_window designates a color value of a right window for a left image.

A number_pixels_of_RL_window designates a left window region configured by a top-to-bottom strip for a right image from a very left pixel to the pixel as many as designated by this value.

A transparency_RL_window designates transparency of a left window for a right image.

A color_RL_window designates a color value of a left window for a right image.

A number_pixels_of_RR_window designates a right window region configured by a top-to-bottom strip for a right image from a very right pixel to the pixel as many as designated by this value.

A transparency_RR_window designates transparency of a right window for a right image.

A color_RR_window designates a color value of a right window for a right image.

Hence, a receiver may be able to know that an invalid region is existed in a left image using the left_view_left_float_window_flag and the left_view_right_float_window_flag and may be able to know that an invalid region is existed in a right image using the right_view_right_float_window_flag and the right_view_right_float_window_flag.

And, the receiver may be able to know width of a vertical bar configuring the floating window using the number_pixels_of_LL_window, the number_pixels_of_LR_window, the number_pixels_of_RL_window, and the number_pixels_of_RR_window.

In case that the receiver displays the floating window in a screen, it may be able to know color information to be used to output the floating window using the color_LL_window, the color_LR_window, the color_RL_window, and the color_RR_window and may be able to know an alpha blending value related to transparency using the transparency_LL_window, the transparency_LR_window, the transparency_RL_window, and the transparency_RR_window.

FIG. 10 is a diagram of XY_handling_type according to one embodiment of the present invention.

The XY_handling_type indicates a kind of edge handling to be applied to a Y side edge of an X image.

If the XY_handling_type is set to '00', it means that a corresponding content, a scene in the content, or a frame is transmitted after a broadcasting station performed a process for an edge violation on a 3D content itself in advance (pre-processed).

If the XY_handling_type is set to '01', it means that a corresponding content, a scene in the content, or a frame is recommended to be performed by an edge-handling in a manner of applying a floating window scheme in a receiver.

If the XY_handling_type is set to '10', it means that a corresponding content, a scene in the content, or a frame is recommended to be performed by an edge-handling in a manner of applying a vertical edge treatment scheme in a receiver.

In the following description, a method of transmitting EH_data( ) according to a codec is explained.

In case of an MPEG-2 video, the EH_data( ) is transmitted in a manner of being included in a user_data( ) of Picture Extension and User Data region similar to a bar_data( ). A receiver extracts the user data( ) satisfying a condition that a user_data_start_code value corresponds to '0*0000 01B2' and a user_data_identifier value corresponds to '0*4741 3934'. If the user_data( ) is extracted, the receiver reads a user_structure( ) data included in the user_data( ) and extracts the EH_data( ) satisfying a condition that the user_data_type_code corresponds to '0*10'. The receiver obtains edge handling-related information on a current stereoscopic image data in a manner of decoding the extracted EH_data( ).

In case of an AVC (H.264) video, the EH_data is received via an SEI RBSP (raw byte sequence payload). A receiver parses an AVC NAL unit. If a nal_unit_type value is '6', it corresponds to a SEI data. The receiver checks a user_identifier value by reading a user_data_registered_itu_t_t35 SEI message satisfying a condition that a payloadType corresponds to '4'. The receiver reads a user_structure( ) satisfying a condition that a user_identifier value corresponds to '0*4741 3934' and then extracts the EH_data( ) satisfying the condition that the user_data_type_code corresponds to '0*10'. The receiver obtains edge handling-related information on a current stereoscopic image data in a manner of decoding the extracted EH_data( ).

The information included in the EH_data( ) provides a parameter to process a method of preventing an edge violation in case that a stereoscopic display intends to output a left/right image.

The EH_data( ) and the bar_data( ) exist in an identical region. The EH_data( ) can be distinguished from the bar_data( ) with the user_data_type_code. The order of receiving and decoding the EH_data( ) can be positioned between a header of a corresponding frame and a video data region of the corresponding frame.

Figure 11:
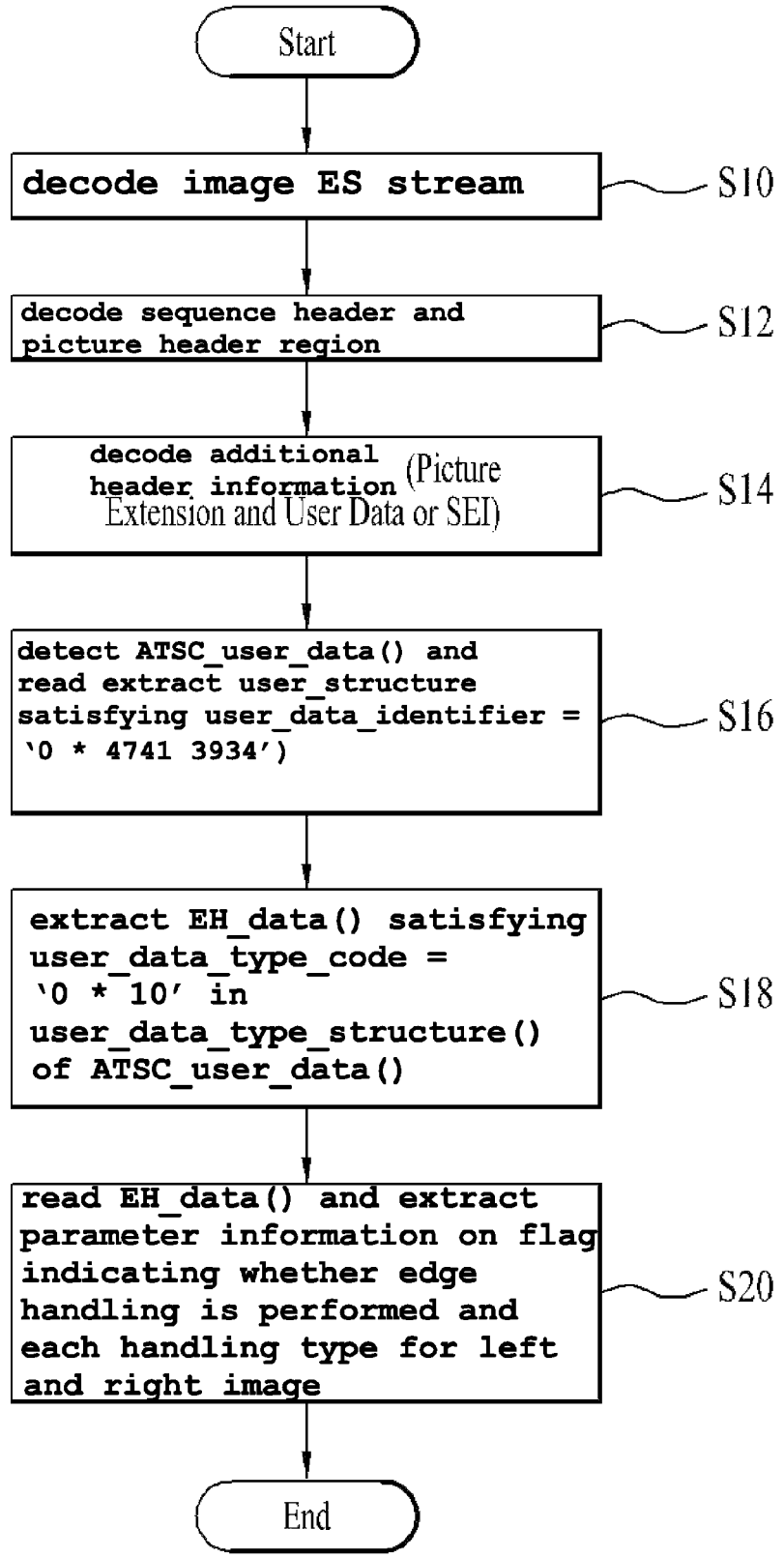
FIG. 11 is a flowchart indicating a method of extracting an edge handling information according to one embodiment of the present invention.

FIG. 11 is a flowchart indicating a method of extracting an edge handling information according to one embodiment of the present invention.

A receiver decodes a video elementary stream (ES) [S10]. Thereafter, the receiver decodes a sequence header and a picture header region [S12] and decodes additional header information [S14]. In this case, the additional header information corresponds to the Picture Extension and User Data in case of the MPEG-2 video and corresponds to the SEI in case of the AVC (H.264) video.

If the additional header information is decoded, the receiver detects an ATSC_user_data( ) and reads it [S16]. In this case, the receiver extracts a user_data satisfying a condition that the user_data_identifier value corresponds to '0*4741 3934'.

The receiver extracts the EH_data( ) satisfying a condition that the user_data_type_code corresponds to '0*10' in a user_data_type_structure( ) of the ATSC_user_data( ) [S18].

The receiver extracts parameter information on a flag indicating whether an edge handling is performed and each handling type for a left image and a right image in a manner of reading the EH_data( ) [S20].

Figure 12:
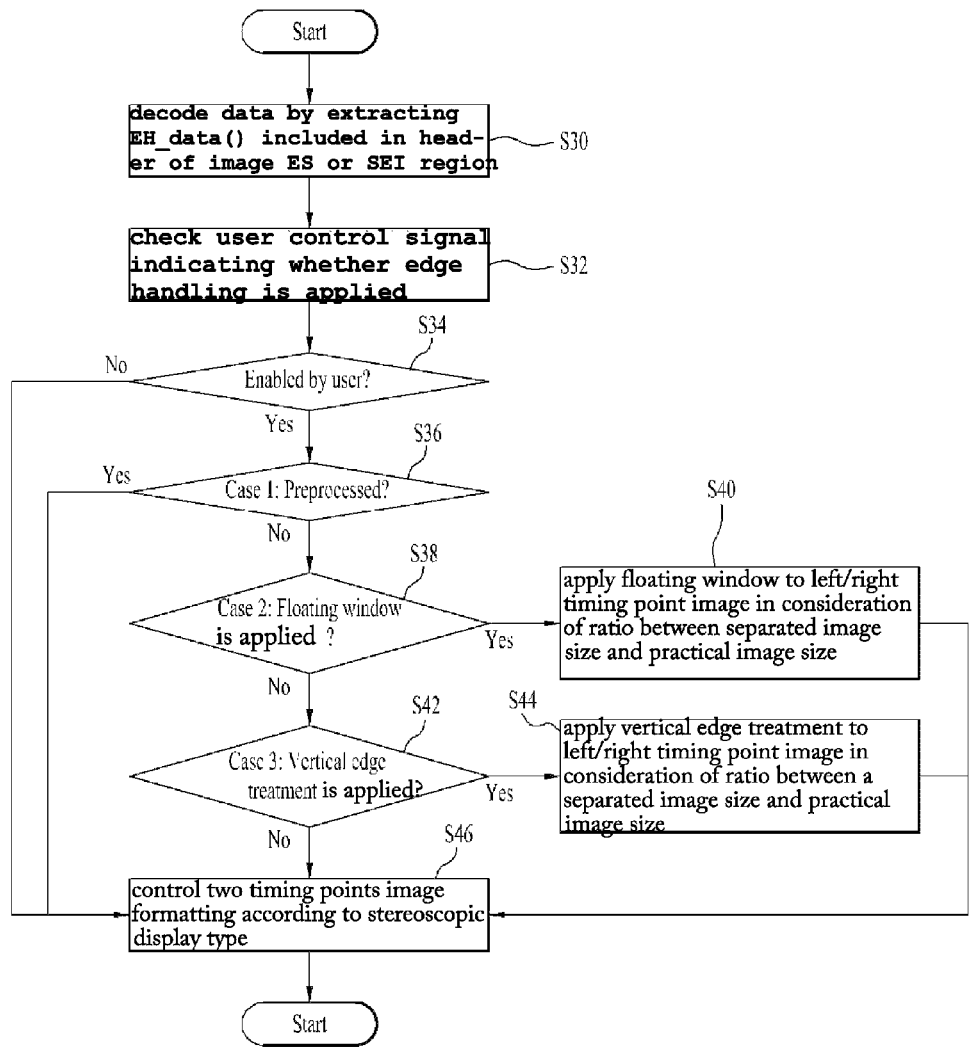
FIG. 12 is a flowchart indicating a method of outputting an edge handling data by decoding in case of using a vertical edge treatment scheme according to one embodiment of the present invention.

FIG. 12 is a flowchart indicating a method of outputting an edge handling data by decoding in case of using a vertical edge treatment scheme according to one embodiment of the present invention.

A receiver decodes a data by extracting the EH_data( ) included in a header of a video ES or an SEI region [S30]. The receiver checks a user control signal indicating whether an edge handling is applied [S32]. The receiver judges whether a user permits an application of the edge handling [S34]. If the application of the edge handling is permitted, the receiver checks whether a pre-processing is performed (case 1) [S36]. If the application of the edge handling is not permitted, the receiver moves to the step of S46.

In case that a pre-processing is performed in the step of S36, the receiver moves to the step of S46. In case that the pre-processing is not performed, the receiver judges whether the floating window is applied (case 2) [S38]. In case that the floating window is applied, the receiver applies the floating window to the left/right timing point image in consideration of a ratio between a separated image size and a practical image size [S40] and moves to the step of S46.

In case that the floating window is not applied, the receiver judges whether a vertical edge treatment is applied (case 3) [S42]. In case that the vertical edge treatment is applied, the receiver applies the vertical edge treatment to the left/right timing point image in consideration of a ratio between a separated image size and a practical image size [S44] and moves to the step of S46.

In case that the vertical edge treatment is not applied, the receiver moves to the step of S46.

In the step of S46, the receiver outputs in a manner of controlling two timing points image formatting according to a stereoscopic display type.

Figure 13:
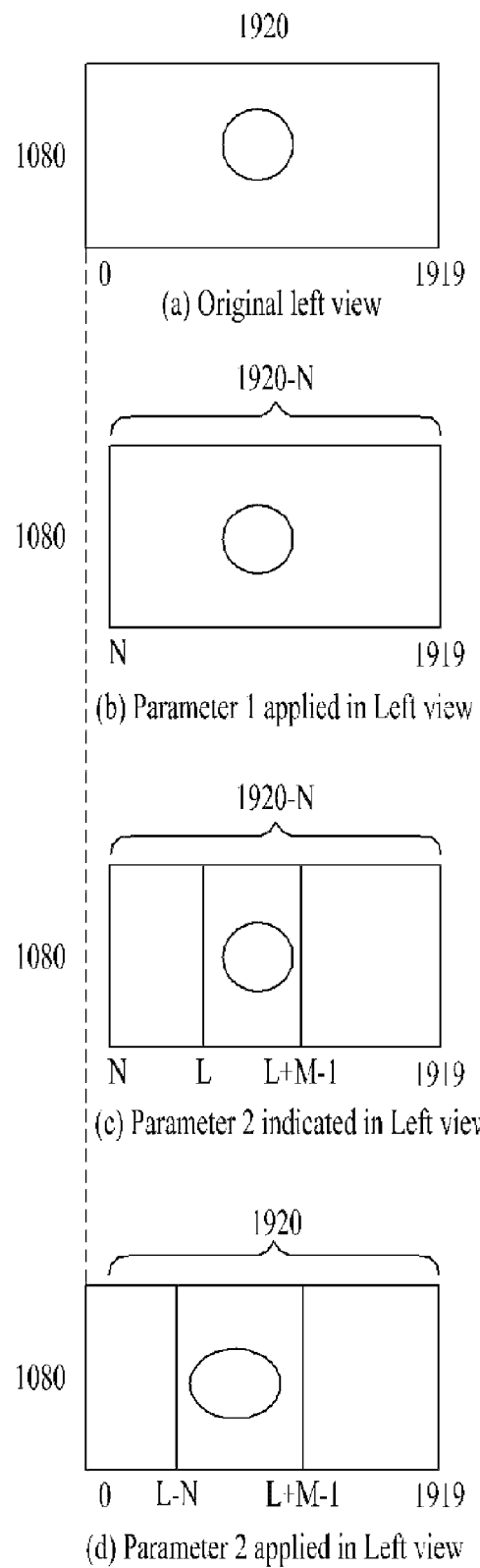
FIG. 13 is a diagram of a vertical edge treatment application according to one embodiment of the present invention.

FIG. 13 is a diagram of a vertical edge treatment application according to one embodiment of the present invention.

FIG. 13 shows an example of an operation in a 3DTV in case that parameter information of a vertical edge treatment for a left edge of a left image is provided. In this case, the parameter information is as follows.

An LL_edge_flag is set to '1' to indicate that an edge handling job for a left edge of a left image is necessary. An LL_handling_type is set to '10' to indicate that a vertical edge treatment scheme is applied. An LL_crop_width_pixel indicating an area of a region to be cropped is set to 'N', an LL_stretch_start_pixel indicating a pixel on which a stretch is started is set to 'L', and an LL_stretch_width_pixel indicating an area of a region to be stretched is set to 'M'. An LL_stretch_parameter( ) indicating a scheme of stretching is set to a linear stretch and then indicates that a linear stretch is applied.

FIG. 13 (a) shows an example of an original image in which an edge violation occurs since an object having a negative disparity exists in a left edge part. Referring to FIG. 13 (b), in order to prevent the original image from the edge violation, a left part of the original image is cropped. Since the LL_crop_width_pixel is set to 'N', a rectangular region of '0' to 'N−1' pixel is cropped. Hence, the original image of '1920*1080' resolution has a resolution of '(1920−N)*1080'.

FIG. 13 (c) indicates a process calculating a region to be stretched. The region to be stretched may become a rectangular region having an area of the LL_stretch_width_pixel with the LL_stretch_start_pixel as a starting point. In particular, the rectangular region starting from an 'L' pixel to '(L+M−1)' pixel can be determined as the region to be stretched.

FIG. 13 (d) is a diagram of a left image resulted from stretching. It is able to see that the rectangular region starting from an 'L' pixel to '(L+M−1)' pixel changed to a rectangular region starting from 'L' pixel to 'N+L+M−1' pixel in a manner of being stretched in left/right direction. Hence, the left image of '(1920−N)*1080' resolution, which is cropped in FIG. 13 (b), is restored to the resolution of the original image, which corresponds to '1920*1080'.

Figure 14:
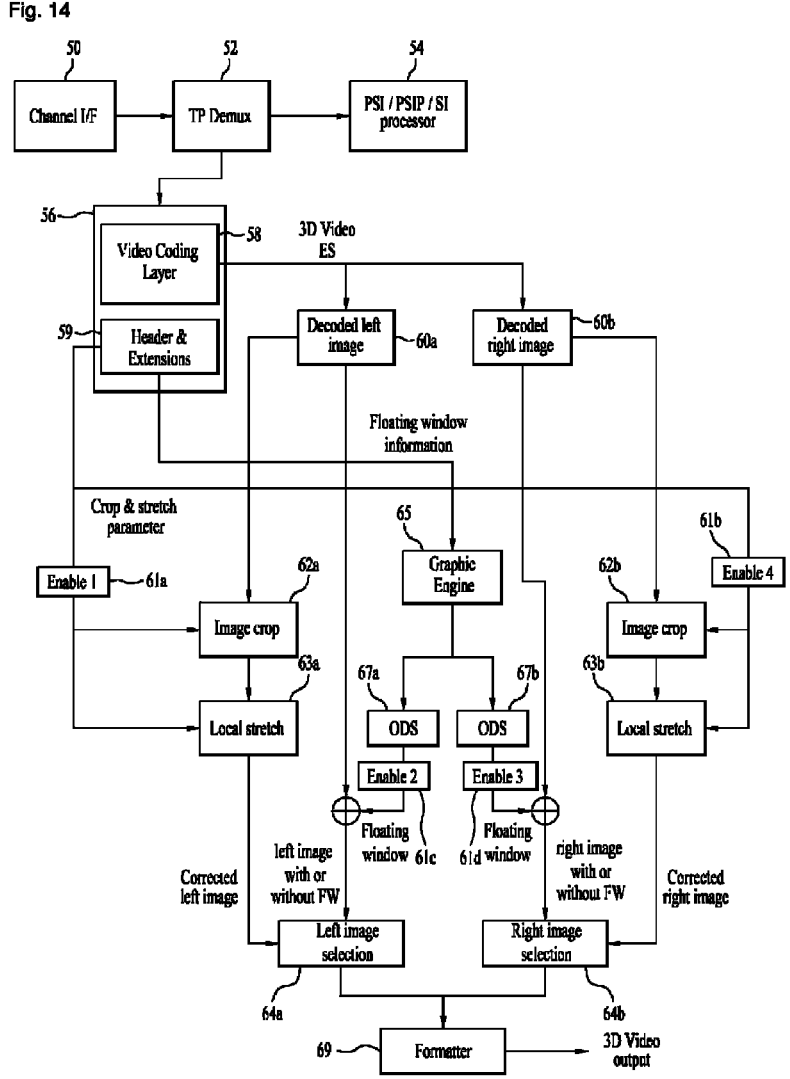
FIG. 14 is a diagram of a receiving device processing an edge violation using a crop and a stretch according to one embodiment of the present invention.

FIG. 14 is a diagram of a receiving device processing an edge violation using a crop and a stretch according to one embodiment of the present invention.

A method of applying a vertical edge treatment can use a method of directly operating a video data in a video data post processing process. As shown in FIG. 14, the video data can be operated in a manner of dividing the video data into a left image and a right image and going through a control block for each of the images.

And, as a different issue, in case that an image scaling process arises or in case that a resolution of a content format (a side-by-side, a top-down, and the like) configured with a sampled left/right image changes from the originally intended resolution, it is necessary to match a scaling, since a level of the contents format may be different from the level of the window size referenced by the edge handling.

In particular, in case of a side-by-side 3D content of '1920*1080' resolution, edge handling-related pixel information is to be signaled is on the basis of a '960*1080' screen. Hence, if an edge handling is applied after each of the left image and the right image is up-scaled to '1920*1080', the signaled edge handling pixel width value should be applied in a manner of being doubly up-scaled.

As a different signaling embodiment, an edge handling parameter can be transmitted on the basis of a video resolution irrespective of the side-by-side. In this case, it may not perform a doubly upscale when a practical display is applied.

According to a further different embodiment, it may be able to use a method of transmitting an edge handling parameter for a fixed reference resolution (e.g., a horizontal resolution is '1920').

A digital broadcasting signal receiving device according to the present invention includes a tuner 50, a demultiplexer (TP Demux) 52, an SI (system information) processor 54, an audio/image decoder 56, an image crop unit 62a/62b, an image stretch unit (local stretch) 63a/63b, a graphic engine 65, an On Screen Display (OSD) 67a/67b, an image selector 64a/64b, and a formatter 69.

If a digital broadcasting signal is received by the tuner 50, the broadcasting signal is demultiplexed by the demultiplexer 52. Among the demultiplexed broadcasting signals, SI information is processed by the SI processor 54 and the audio/image signal is inputted to the A/V decoder 56.

The A/V decoder 56 decodes a video header and additional header 59 and then extracts the information on whether the receiving device applies a floating window scheme or a vertical edge treatment scheme. And, the A/v decoder 56 decodes a 3D image via a video coding layer 58.

In case of applying the vertical edge treatment scheme, Enable 1 and Enable 4 61a/61d are activated and then the image crop unit 62a/62b and the image stretch unit 63a/63b operate. The image crop unit 62a/62b and the image stretch unit 63a/63b operate in a manner of receiving a video header decoded by the A/V decoder 56 and a crop and stretch parameter for the vertical edge treatment included in the additional header 59.

A part of a decoded left image 60a and a part of a decoded right image 60b are cropped based on a parameter inputted by the image crop unit 62a/62b. The cropped left and the right image are inputted to the image stretch units 63a/63b, respectively and are then stretched to the resolution of which the crop is not performed yet by the inputted parameter. In this case, the image crop unit 62a/62b and the image stretch unit 63a/63b can operate in manner of being combined into an image editing unit.

In case of applying the floating window scheme, Enable 2 and Enable 3 61b/61c are activated and then the graphic engine 65 and the OSD 67a/67b operate. The graphic engine 65 determines a size, color, transparency, and the like of a floating window in a manner of receiving an input of a decoded video header and floating window information included in the additional header 59 and then generates the floating window. The OSD 67a/67b displays the floating window in a manner of overlaying the decoded left/right image 60a/60b with the generated floating window.

The meaning of the aforementioned Enable N (N=1, . . . , 4) is as follows. The Enable 1 means that crop & stretch is applied to a left image. The Enable 2 means that a floating window is applied to the left image. The Enable 3 means that the floating window is applied to a right image. The Enable 4 means that the crop & stretch is applied to the right image.

A left and right image selector 64a/64b selects an image according to each case and delivers the image to the formatter 69. For instance, in case of using the floating window scheme, a decoded image overlaid with a floating window is inputted into the formatter. In case of using the vertical edge treatment (crop & stretch) scheme, a corrected image to which the crop & stretch is applied is inputted to the formatter. If a preprocessed image is inputted or if both the floating window and the vertical edge treatment are disabled, an image outputted from the audio/image decoder 56 is directly inputted to the formatter 69, since a separate job is not necessary.

The formatter outputs a 3D image in a manner of combining the inputted left and right image.

Mode For Invention

As mentioned in the foregoing description, the related is described in the best mode for invention.

INDUSTRIAL APPLICABILITY

As mentioned in the foregoing description, the present invention can be Applied to a whole or a part of a digital broadcasting system.

What is claimed is:

1. A digital broadcasting signal receiving device providing a stereoscopic 3 dimensional image, comprising:
    a tuner configured to receive a digital broadcasting signal, which includes a stereoscopic 3 dimensional image signal containing an edge handling information;
    a demultiplexer configured to demultiplex the received digital broadcasting signal;
    a decoder configured to extract original images and the edge handling information by decoding the 3 dimensional image signal among the demultiplexed broadcasting signal;
    an image editing unit configured to edit images by cropping a first region corresponding to a boundary in which an edge violation occurs and stretching a second region corresponding to a part of a remaining region of the original images using the edge handling information; and
    a formatter configured to output an edge handled stereoscopic 3 dimensional image signal by receiving the edited images.

2. The digital broadcasting signal receiving device of claim 1, further comprising:
    a graphic engine configured to generate a floating window using the edge handling information;

an On Screen Display OSD) configured to overlay the original images with the generated floating window; and an image selector configured to output to the formatter in a manner of selecting either the edited image or the image overlaid with the floating window, wherein the formatter outputs the edge handled stereoscopic 3 dimensional image signal based on the edited images or the images overlaid with the floating window.

3. The digital broadcasting signal receiving device of claim 2, wherein the edge handling information comprises at least one information on selected from the group consisting of a vertical edge treatment and the floating window.

4. The digital broadcasting signal receiving device of claim 3, wherein the information on the vertical edge treatment comprises at least one information on selected from the group consisting of an area of a region to be cropped, a starting point of a region to be stretched, an area of a region to be stretched, and a stretch method.

5. The digital broadcasting signal receiving device of claim 3, wherein the information on the floating window comprises at least one selected from the group consisting of an area of the floating window, color, and transparency.

6. The digital broadcasting signal receiving device of claim 2, wherein if the edge handling information indicates that the original images are already preprocessed, the image editing unit, the graphic engine and the OSD are configured not to operate.

7. A method of receiving a digital broadcasting signal providing a stereoscopic 3 dimensional image, comprising the steps of:

receiving a digital broadcasting signal, which includes a stereoscopic 3 dimensional image signal containing an edge handling information;

demultiplexing the received digital broadcasting signal;

extracting original images and the edge handling information by decoding the 3 dimensional image signal among the demultiplexed broadcasting signal;

editing images by cropping a first region corresponding to a boundary in which an edge violation occurs and stretching a second region corresponding to a part of a remaining region of the original images using the edge handling information; and outputting an edge handled stereoscopic 3 dimensional image signal by receiving the edited images.

8. The method of claim 7, further comprising the step of generating a floating window and overlayinginal images with the floating window; and selecting either the edited image or the image overlaid with the floating window before the step of outputting the 3 dimensional image signal, wherein the outputting the edge handled stereoscopic 3 dimensional image signal is based on the edited images or the images overlaid with The floating window.

9. The method of claim 8, wherein the edge handling information comprises at least one information on selected from the group consisting of a vertical edge treatment and the floating window.

10. The method of claim 9, wherein the information on the vertical edge treatment comprises at least one information on selected from the group consisting of an area of a region to be cropped, a starting point of a region to be stretched, an area of a region to be stretched, and a stretch method.

11. The method of claim 9, wherein the information on the floating window comprises at least one selected from the group consisting of an area of the floating window, color, and transparency.

12. The method of claim 8, wherein if the edge handling information indicates that the original images are already preprocessed, the step of editing the images or overlaying the floating window is not performed.

* * * * *